United States Patent
Ogawa et al.

(10) Patent No.: US 9,663,332 B2
(45) Date of Patent: May 30, 2017

(54) NOTIFICATION DEVICE AND MOVEMENT SYSTEM

(71) Applicant: GOGOH CO., LTD., Kasugai-shi, Aichi (JP)

(72) Inventors: Kouji Ogawa, Kasugai (JP); Fujioki Yamaguchi, Kasugai (JP)

(73) Assignee: GOGOH CO., LTD., Kasugai-shi (JP)

( * ) Notice: Subject to any disclaimer, the term of this patent is extended or adjusted under 35 U.S.C. 154(b) by 0 days.

(21) Appl. No.: 14/894,612

(22) PCT Filed: Jun. 12, 2015

(86) PCT No.: PCT/JP2015/067020
§ 371 (c)(1),
(2) Date: Nov. 30, 2015

(87) PCT Pub. No.: WO2016/117143
PCT Pub. Date: Jul. 28, 2016

(65) Prior Publication Data
US 2016/0347587 A1    Dec. 1, 2016

(30) Foreign Application Priority Data

Jan. 23, 2015  (JP) .................................. 2015-011317

(51) Int. Cl.
*B66C 13/16*    (2006.01)
*B66C 15/00*    (2006.01)
(Continued)

(52) U.S. Cl.
CPC .............. *B66C 13/16* (2013.01); *B66C 15/00* (2013.01); *B66C 15/06* (2013.01); *G08B 5/22* (2013.01);
(Continued)

(58) Field of Classification Search
CPC ......... B66C 13/16; B66C 15/00; B66C 15/06; G08B 5/22; H02P 27/06; H02P 29/00
See application file for complete search history.

(56) References Cited

U.S. PATENT DOCUMENTS

| | | | |
|---|---|---|---|
| 2007/0115107 A1* | 5/2007 | Kageyama | B60K 37/02 340/461 |
| 2014/0054254 A1 | 2/2014 | Ogawa et al. | |
| 2016/0155305 A1* | 6/2016 | Barsilai | G06F 3/016 340/407.1 |

FOREIGN PATENT DOCUMENTS

| | | |
|---|---|---|
| JP | S48-41910 Y1 | 12/1973 |
| JP | 2006-094667 A | 4/2006 |

(Continued)

OTHER PUBLICATIONS

International Search Report (Form PCT/ISA/210), Written Opinion (Form PCT/ISA/237), and Notification of Transmittal of the International Search Report and the Written Opinion of the International Search Authority (Form PCT/ISA/220) for International Patent Application No. PCT/JP2015/067020 dated Aug. 25, 2015 with English Translation of Written Opinion (Form PCT/ISA/237), 12 pages (including translation).

*Primary Examiner* — Leon Flores
(74) *Attorney, Agent, or Firm* — Withrow & Terranova, P.L.L.C.; Vincent K. Gustafon (57) ABSTRACT

A notification device is used in a moving device and comprises a main unit that can move a moving body by a driving force of a motor and a control unit that controls the motor in response to an operation input. The notification device comprises an operation information acquisition unit that acquires operation information of the motor from the control unit and a notification unit that, when the motor is in operation, makes a notification different from a notification at the time when the motor is stopped.

16 Claims, 9 Drawing Sheets

(51) Int. Cl.
*H02P 29/00* (2016.01)
*B66C 15/06* (2006.01)
*G08B 5/22* (2006.01)
*H02P 27/06* (2006.01)
*B66C 17/00* (2006.01)

(52) U.S. Cl.
CPC .............. *H02P 27/06* (2013.01); *H02P 29/00* (2013.01); *B66C 17/00* (2013.01)

(56) References Cited

FOREIGN PATENT DOCUMENTS

| | | |
|---|---|---|
| JP | 2009-263069 A | 11/2009 |
| JP | 48-15627 B2 | 11/2011 |
| WO | 2013-114737 A1 | 8/2013 |

\* cited by examiner

NOTIFICATION DEVICE AND MOVEMENT SYSTEM

CROSS-REFERENCE TO RELATED APPLICATIONS

This application is a 35 U.S.C. §371 national phase filing of International Application No. PCT/JP2015/067020, filed Jun. 12, 2015, and claims the benefit of Japanese Patent Application No. 2015-11317 filed Jan. 23, 2015 in the Japan Patent Office. The entire disclosures of International Application No. PCT/ JP2015/067020 and Japanese Patent Application No. 2015-11317 are hereby incorporated by reference herein in their respective entireties.

TECHNICAL FIELD

The present invention relates to a notification device and a movement system.

BACKGROUND ART

Three-dimensional moving devices such as an overhead traveling crane are conventionally known (see Patent Document 1). A three-dimensional moving device is provided with a hook freely movable in a three-dimensional space, and is able to hang an article on the hook thereby to move the article. An operator of a three-dimensional moving device performs operation inputs to a controller to operate the three-dimensional moving device. The operation inputs include an operation input to start movement for moving the not-moving hook in any of the directions, an operation input to stop movement for stopping the moving hook and the like.

PRIOR ART DOCUMENTS

Patent Documents

Patent Document 1: Japanese Patent No. 4815627

SUMMARY OF THE INVENTION

Problems to be Solved by the Invention

Even if the operation input to stop movement is performed to a controller, the hook and the article hung thereon may not immediately stop. Therefore, even after the operation input to stop movement, there is a possibility that the hook and the article come into contact with the operator. In one aspect of the present invention, it is desirable to provide a notification device and a movement system that can enhance safety of a moving device.

Means for Solving the Problems

A notification device in one aspect of the present invention is a device used in a moving device comprising a main unit that can move a moving body by a driving force of a motor and a control unit that controls the motor in response to an operation input. The notification device comprises an operation information acquisition unit that acquires operation information of the motor from the control unit and a notification unit that, when the motor is in operation, makes a notification different from a notification at the time when the motor is stopped.

The notification device, when the motor is in operation, makes a notification different from a notification at the time when the motor is stopped. Therefore, an operator of the moving device, for example, even after performing an operation input instructing to stop the motor, can easily recognize that the motor is in operation (i.e., the moving body is moving). Safety of the operator is enhanced.

A notification device in another aspect of the present invention is a device used in a moving device comprising a main unit that can move a moving body by a driving force of a motor and a control unit that controls the motor in response to an operation input. The notification device comprises a motion detection unit that detects a motion of the moving body or an article attached to the moving body, and a notification unit that, when the moving body or the article is in motion, makes a notification different from a notification at the time when the moving body or the article is stopped.

The notification device detects a motion of the moving body or the article, and, when the moving body or the article is in motion, makes a notification different from a notification at the time when the moving body or the article is stopped. Therefore, an operator of the moving device, for example, even after performing an operation input instructing to stop the motor, can easily recognize that the moving body or the article is in motion. Safety of the operator is enhanced.

A notification device in a further aspect of the present invention is a device used in a moving device comprising a main unit that can move a moving body by a driving force of a motor and a control unit that controls the motor in response to an operation input. The notification device comprises an operation input acquisition unit that acquires the operation input, and a notification unit that makes a prescribed notification when the operation input acquisition unit acquires the operation input instructing to start operation of the motor and continues the prescribed notification from when the operation input acquisition unit acquires an operation input instructing to stop operation of the motor until a preset time elapses.

The notification device continues a prescribed notification from when the operation input acquisition unit acquires an operation input instructing to stop operation of the motor until a preset time elapses. Thereby, safety of the operator is enhanced.

EXPLANATION OF REFERENCE NUMERALS 1, 101, 201 . . . notification device, 3 . . . moving device, 4 . . . indicator, 4A . . . screen, 5 . . . operation information acquisition unit, 7 . . . notification unit, 9A, 9B . . . traveling rail, 11A, 11B . . . saddle, 13 . . . crane girder, 15 . . . hoist, 17 . . . support wire, 19 . . . hook, 21 . . . controller, 23 . . . communication cable, 25 . . . X-axis motor, 27 . . . Y-axis motor, 29 . . . Z-axis motor, 31 . . . control unit, 33 . . . X-axis inverter, 35 . . . Y-axis inverter, 37 . . . Z-axis inverter, 39 . . . motion detection unit, 41 . . . sensor, 43 . . . operation input acquisition unit.

MODE FOR CARRYING OUT THE INVENTION

Embodiments of the present invention will be described with reference to the drawings.

<First Embodiment>

1. Configuration of Notification Device 1, Moving Device 3, and Indicator 4

Figure 1:
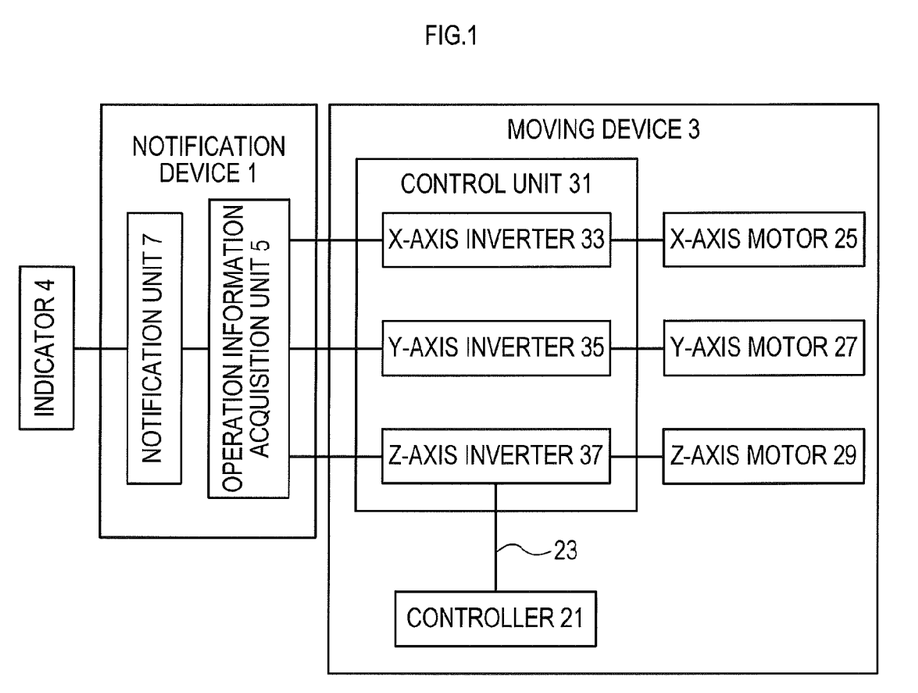
FIG. 1 is a block diagram showing an electrical configuration of a notification device, a moving device, and an indicator according to a first embodiment of the present invention.

A description on a configuration of a notification device 1, a moving device 3, and an indicator 4 will be given based on FIGS. 1 and 2. The notification device 1 is a device that makes a notification on a state of the moving device 3. The notification device 1 is a computer comprising a CPU, a RAM, a ROM and so on. As shown in FIG. 1, the notification device 1 functionally comprises an operation information acquisition unit 5, and a notification unit 7. A function of each unit will be described later.

The notification device 1 controls the indicator 4 so that the indicator 4 performs a specified indication. The indicator 4 is provided with a liquid crystal display and can display images. Particularly how the notification device 1 controls the indicator 4 will be described later.

The moving device 3 is an overhead traveling crane. As shown in FIG. 2, the moving device 3 is provided with traveling rails 9A, 9B, saddles 11A, 11B, a crane girder 13, a hoist 15, a support wire 17, a hook 19, a controller 21, and a communication cable 23.

The traveling rails 9A, 9B are laid near the ceiling of a building. The traveling rails 9A, 9B are parallel to each other in their longitudinal direction and are in a horizontal plane. In the following description, the longitudinal direction of the traveling rails 9A, 9B is referred to as an X direction.

The saddle 11A is provided on the traveling rail 9A and is movable in the X direction. Also, the saddle 11B is provided on the traveling rail 9B and is movable in the X direction in conjunction with the saddle 11A. A driving source for moving the saddles 11A, 11B is an X-axis motor 25 which will be described later.

One end of the crane girder 13 is fixed on the saddle 11A, and the other end is fixed on the saddle 11B. A longitudinal direction of the crane girder 13 is a direction in the horizontal plane and orthogonal to the X direction (hereinafter, referred to as a Y direction). The saddles 11A, 11B and the crane girder 13 are movable in the X direction together.

The hoist 15 is attached to the crane girder 13 in a manner movable along the Y direction. A driving source for moving the hoist 15 along the Y direction is a Y-axis motor 27 which will be described later. Further, the hoist 15 is able to wind up and pull out the support wire 17. A driving source for winding up and pulling out the support wire 17 is a Z-axis motor 29 which will be described later.

The hook 19 is attached to a distal end of the support wire 17. The hook 19 moves upward when the hoist 15 winds up the support wire 17, and moves downward when the hoist 15 pulls out the support wire 17. That is, the hook 19 is movable along a vertical direction (hereinafter, sometimes referred to as a Z direction). The hook 19 can hang an article to be moved.

The controller 21 accepts operation inputs for operating the moving device 3. The controller 21 has a plurality of switches. An operation input is performed by operating a specific switch in a specific operation manner.

There are operation inputs to start moving in the X-direction, stop moving in the X-direction, start moving in the Y-direction, stop moving in the Y-direction, start moving in the Z-direction, stop moving in the Z-direction, and the like.

The communication cable 23 transmits a signal representing the operation input accepted by the controller 21 to a control unit 31 which will be described later.

The moving device 3 having the above configuration can move the hook 19 independently along the X-direction, Y-direction, and Z-direction. That is, it is possible to move the hook 19 in the X direction by moving the saddles 11A, 11B on the traveling rails 9A, 9B in the X direction. It is also possible to move the hook 19 in the Y direction by moving the hoist 15 on the crane girder 13 in the Y direction. It is also possible to move the hook 19 in the Z direction as the hoist 15 winds up or pulls out the support wire 17.

Relationship between operation inputs to the controller 21 and movement of the hook 19 is as follows. When there is an operation input to start moving in the X-direction while the hook 19 is not moving in the X direction, the X-axis motor 25 is started and the hook 19 starts moving in the X direction. Thereafter, when there is an operation input to stop moving in the X-direction during the move in the X direction, the move in the X direction stops a few seconds after the operation input. Note that a time difference of a few seconds from the operation input to stop moving in the X-direction until the stop of the move is due to time required for the X-axis motor 25 to decelerate and stop.

When there is an operation input to start moving in the Y-direction while the hook 19 is not moving in the Y direction, the Y-axis motor 27 is started and the hook 19 starts moving in the Y direction. Then, when there is an operation input to stop moving in the Y-direction during the move in the Y direction, the move in the Y direction stops a few seconds after the operation input.

When there is an operation input to start moving in the Z-direction while the hook 19 is not moving in the Z direction, the Z-axis motor 29 is started and the hook 19 starts moving in the Z direction. Then, when there is an operation input to stop moving in the Z-direction during the move in the Z direction, the move in the Z direction stops a few seconds after the operation input.

Figure 2:
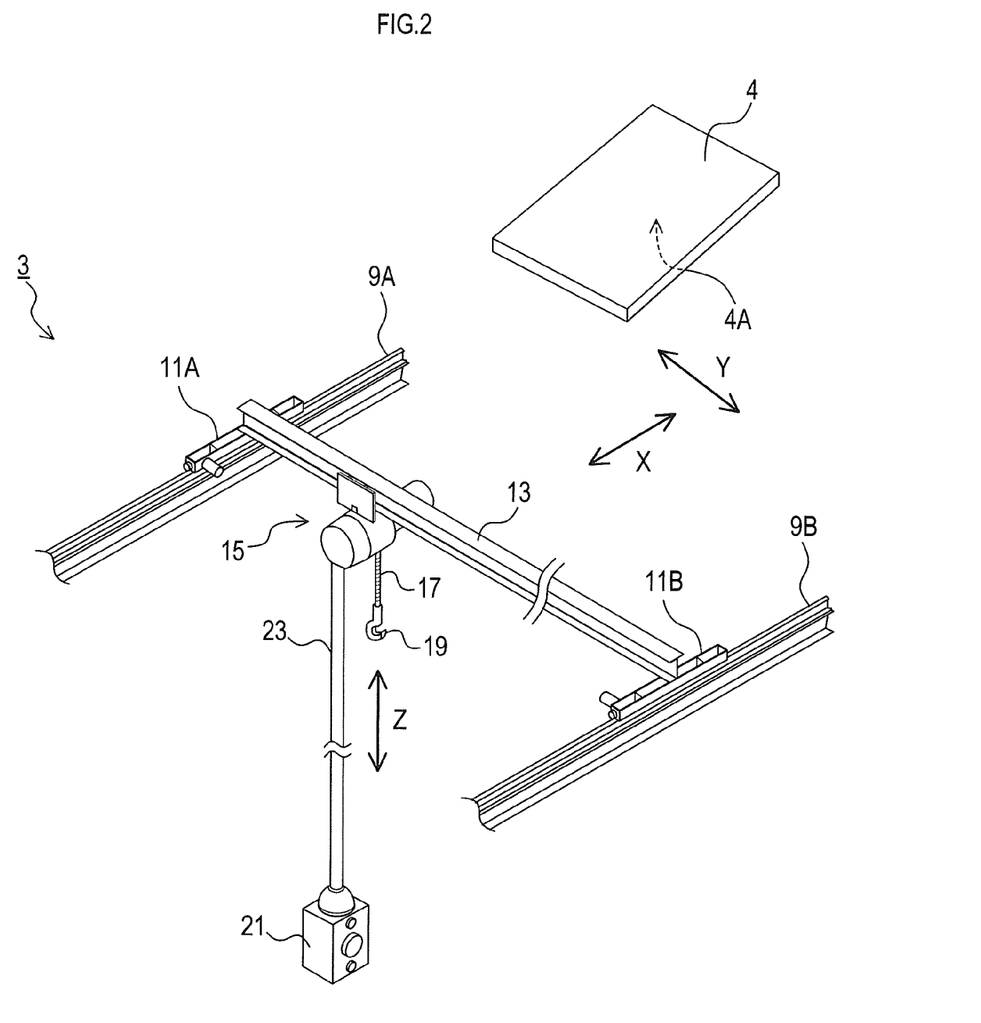
FIG. 2 is a perspective view showing a configuration of the moving device shown in FIG. 1.

As shown in FIG. 2, the indicator 4 described above is provided above the moving device 3. A screen 4A that can display images is facing downward. Thus, an operator who operates the controller 21 can easily watch the screen 4A when facing upwards.

An electrical configuration of the moving device 3 is as shown in FIG. 1. The moving device 3 comprises the X-axis motor 25, the Y axis motor 27, the Z axis motor 29, the control unit 31 and the controller 21 described above. The X-axis motor 25 is a driving source for moving the saddles 11A, 11B along the X direction. The Y-axis motor 27 is a driving source for moving the hoist 15 along the Y direction. The Z-axis motor 29 is a driving source for the hoist 15 to wind up or puling out the support wire 17.

The control unit 31 controls the X-axis motor 25, the Y-axis motor 27 and the Z-axis motor 29 in response to an operation input accepted by the controller 21. The control unit 31 comprises an X-axis inverter 33, a Y-axis inverter 35, and a Z-axis inverter 37. The X-axis inverter 33 is used to control the X axis motor 25. The Y-axis inverter 35 is used to control the Y-axis motor 27. The Z-axis inverter 37 is used to control the Z-axis motor 29.

Relationship between an operation input to the controller 21 and the operation of each motor is as follows. When there is an operation input to start moving in the X-direction while the X-axis motor 25 is not moving, the X-axis motor 25 is started. Then when a rotational speed of the X-axis motor 25 is gradually increased and reaches a preset upper limit value, the upper limit value is maintained. Thereafter, when there is an operation input to stop moving in the X-direction, the rotational speed is gradually decreased, and the X-axis motor 25 stops a few seconds after the operation input to stop moving in the X-direction. Note that a time difference of a few seconds from the operation input to stop moving in the X-direction to the stop of the X-axis motor 25 is due to time required to reduce the rotational speed of the X-axis motor 25 and stop the X-axis motor 25.

When there is an operation input to start moving in the Y-direction while the Y-axis motor 27 is not moving, the Y-axis motor 27 is started. Then when the rotational speed is gradually increased and reaches a preset upper limit value, the upper limit value is maintained. Thereafter, when there is an operation input to stop moving in the Y-direction, the rotational speed is gradually decreased, and the Y-axis motor 27 stops a few seconds after the operation input to stop moving in the Y-direction.

When there is an operation input to start moving in the Z-direction while the Z-axis motor 29 is not moving, the Z-axis motor 29 is started. Then when the rotational speed is gradually increased and reaches a preset upper limit value, the upper limit value is maintained. Thereafter, when there is an operation input to stop moving in the Z direction, the rotational speed is gradually decreased, and the Z-axis motor 29 stops a few seconds after the operation input to stop moving in the Z direction.

The X-axis inverter 33 outputs operation information of the X-axis motor 25 to an operation information acquisition unit 5 of the notification device 1. Here, the operation information is information indicating whether the motor is in operation (rotational speed is not zero) or not. The Y axis inverter 35 outputs the operation information of the Y-axis motor 27 to the operation information acquisition unit 5. The Z axis inverter 37 outputs the operation information of the Z-axis motor 29 to the operation information acquisition unit 5.

The hook 19 is an example of a moving body. The traveling rails 9A, 9B, the saddles 11A, 11B, the crane girder 13, the hoist 15, the supporting wire 17, the hook 19, the X-axis motor 25, the Y-axis motor 27 and the Z-axis motor 29 are examples of a main unit. A combination of the moving device 3 and the notification device 1 is an example of a movement system.

In FIG. 2, the electrical components (control unit 31, X-axis inverter 33, Y-axis inverter 35, Z-axis inverter 37, X-axis motor 25, Y-axis motor 27, Z-axis motor 29) of the moving device 3 are omitted for convenience. These electrical components can be placed at appropriately selected locations in FIG. 2.

2. Process Executed by Notification Device 1

Figure 3:
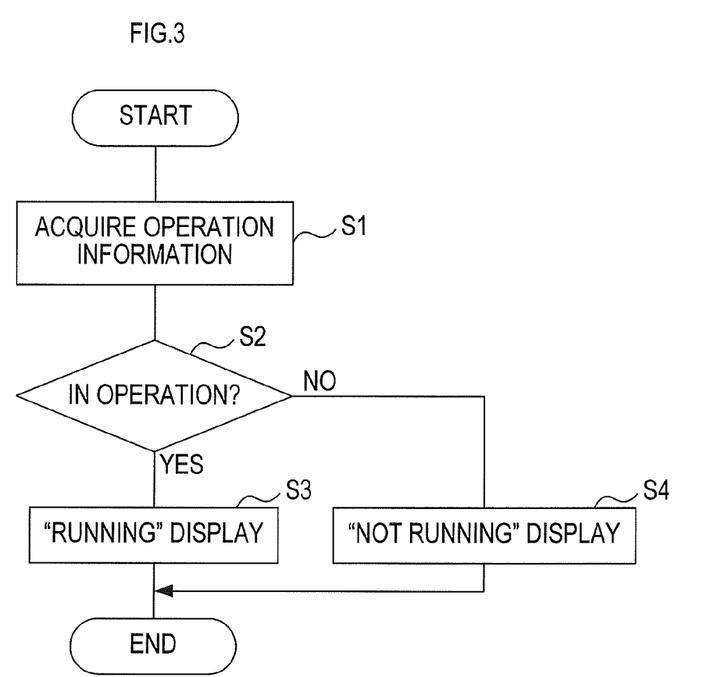
FIG. 3 is a flowchart illustrating a process executed by the notification device shown in FIG. 1.
Figure 4A:
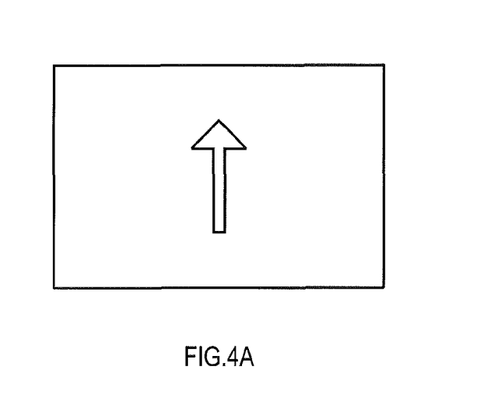
FIG. 4A is an explanatory view showing an indication when the moving device is in operation.
Figure 4B:
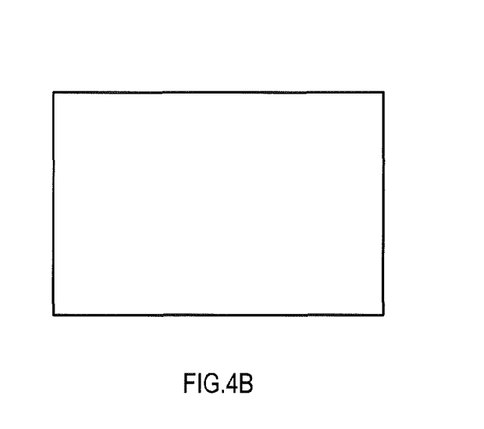
FIG. 4B is an explanatory diagram showing an indication when the moving device is stopped.

A process repeated by the notification device 1 at fixed time intervals will be described with reference to FIGS. 3 and 4A-4B. In Step 1 of FIG. 3, the operation information acquisition unit 5 acquires the operation information of the X-axis motor 25 from the X-axis inverter 33, the operation information of the Y-axis motor 27 from the Y-axis inverter 35, and the operation information of the Z-axis motor 29 from the Z-axis inverter 37.

In Step 2, the notification unit 7 determines whether there is at least one operation information indicating that the motor is in operation in the operation information acquired in Step 1. The process proceeds to Step 3 if there is at least one operation information indicating that the motor is in operation. Otherwise, the process proceeds to Step 4.

In Step 3, the notification unit 7 causes the indicator 4 to display a "running" indication. The "running" indication, as shown in FIG. 4A, is a representation of an arrow indicating a direction in which the hook 19 is moving at that time.

In step 4, the notification unit 7 causes the indicator 4 to display a "not running" indication. The "not moving" indication, as shown in FIG. 4B, is an indication that indicates nothing The "not running" indication and the "running" indication described above are different indications.

3. Effect Achieved by Notification Device 1

(1A) The "running" indication by the notification device 1 continues during operation of the X-axis motor 25 (while the hook 19 is moving in the X direction) even after there has been an operation input to stop moving in the X-direction. Therefore, it is possible for the operator of the moving device 3 to easily recognize that the hook 19 is moving in the X direction even after there has been an operation input to stop moving in the X-direction. Thereby, safety of the operator is enhanced.

Figure 5:
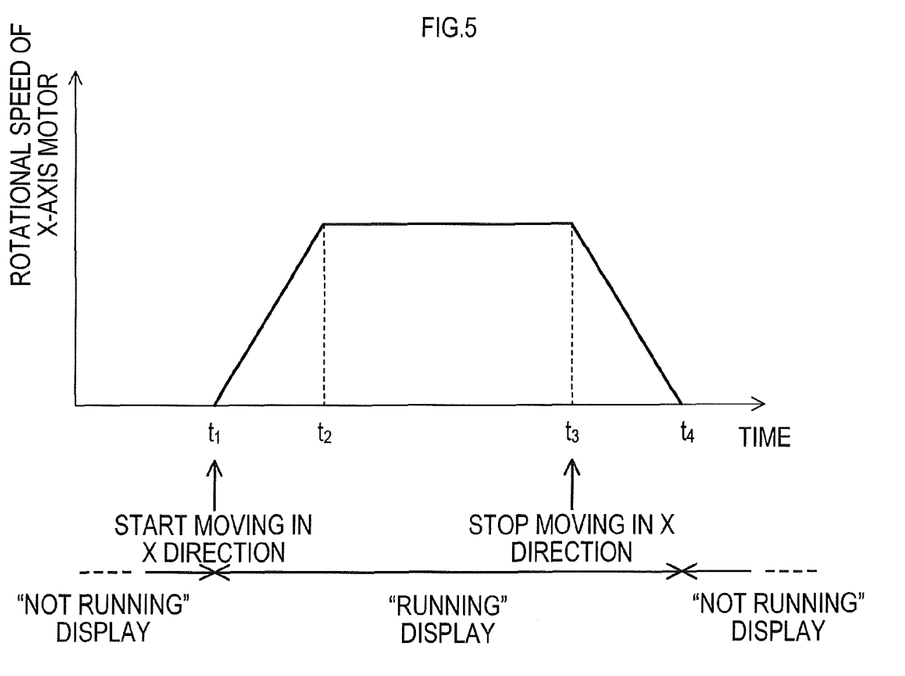
FIG. 5 is an explanatory diagram showing an example of a relationship between operation and indication of the motor.

The above effect will be described in a case shown in FIG. 5. In this case, the X-axis motor 25 was stopped before time t1. There was an operation input to start moving in the X-direction at the time t1. After the time t1, the rotational speed of the X-axis motor 25 was gradually increased, reaching the upper limit value at time t2. Thereafter, the upper limit value was maintained. Then, there was an operation input to stop moving in the X-direction at time t3. After the time t3, the rotational speed of the X-axis motor 25 was gradually reduced, becoming zero (0) at time t4. After the time t4, the X-axis motor 25 was stopped.

In the above case, the "running" indication by the notification device 1 continues from the time t1 to the time t4. A period during which the "running" indication continues also includes a period after the time t3 when there was the operation input to stop moving in the X-direction. Thus, the operator of the moving device 3, even after the time t3, can recognize from the "running" indication shown on the indicator 4 that the hook 19 is moving in the X direction. As a result, safety of the operator is enhanced.

The "running" indication by the notification device 1 also continues during the operation of the Y-axis motor 27 (while the hook 19 is moving in the Y direction), even after there is an operation input to stop moving in the Y-direction. Therefore, safety of the operator is enhanced.

The "running" indication by the notification device 1 also continues during the operation of the Z-axis motor 29 (while the hook 19 is moving in the Z direction), even after there is an operation input to stop moving in the Z direction. Therefore, safety of the operator is enhanced.

(1B) The notification device 1 acquires the operation information from the X-axis inverter 33, Y-axis inverter 35 and Z-axis inverter 37. Thereby, the operation information can be easily acquired.

(1C) The notification device 1 displays images of the "running" indication and the "not running" indication on the indicator 4. Thereby, the operator can easily understand contents of the indications.

<Second Embodiment>

1. Configuration of Notification Device 101, Moving Device 3, and Indicator 4

Figure 6:
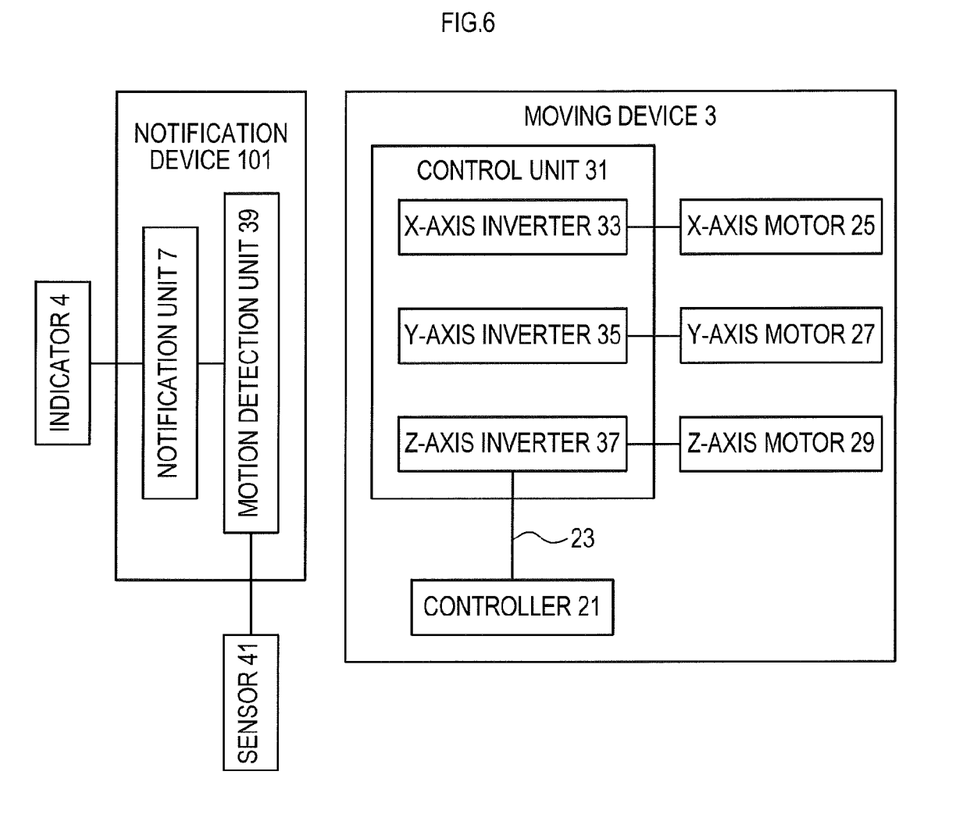
FIG. 6 is a block diagram showing an electrical configuration of a notification device, a moving device, and an indicator according to a second embodiment of the present invention.

A configuration of a notification device 101, the moving device 3, and the indicator 4 will be explained based on FIG. 6. The moving device 3 and the indicator 4 are the same as those of the first embodiment.

Although the notification device 101 is basically the same as the notification device 1 of the first embodiment, there are some differences. The differences will be focused in the following description. The notification device 101 functionally comprises a motion detection unit 39, and the notification unit 7. The motion detection unit 39 acquires a detection result from a sensor 41. The sensor 41 is a sensor for detecting a motion of the hook 19. The motion of the hook 19 to be detected by the sensor 41 may be a motion in a fixed direction, a pendulum motion, or a random motion. The motion of the hook 19 to be detected by the sensor 41 may be a motion in the X-direction, a motion in the Y-direction, a motion in the Z-direction, any of the motion in a two-dimensional plane, or any of the motion in a three-dimensional space. The motion of the hook 19 to be detected by the sensor 41 may be a motion by swinging of the support wire 17 after each motor is stopped, or a motion when one of the motor has not yet been stopped.

As the sensor 41, for example, a laser rangefinder, a photo sensor, an acceleration sensor, a motion sensor or the like can be used. A laser rangefinder or a photo sensor can be attached to a fixed member other than the hook 19. An acceleration sensor or a motion sensor can be attached to the hook 19. Specific function of each unit will be described later.

2. Process Executed by Notification Device 101

Figure 7:
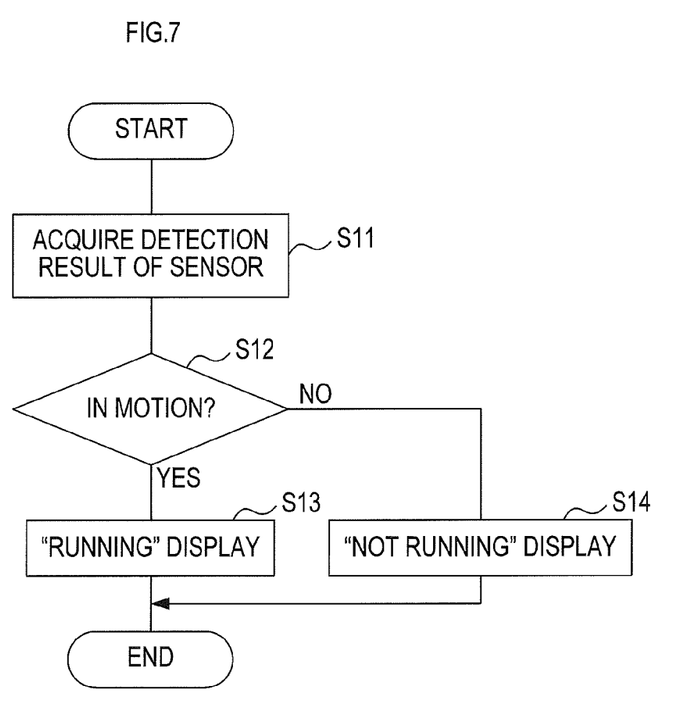
FIG. 7 is a flowchart illustrating a process executed by the notification device shown in FIG. 6.

A process repeated by the notification device 101 at fixed time intervals will be described with reference to FIG. 7. In Step 11 of FIG. 7, the operation detection unit 39 acquires a detection result of the sensor 41. The detection result of the sensor 41 is information indicating the motion of the hook 19.

In Step 12, the notification unit 7 determines whether the hook 19 is in motion from the detection result of the sensor 41 acquired in Step 11. The process proceeds to Step 13 when the hook 19 is in motion. The process proceeds to Step 14 if the hook 19 is stopped.

In Step 13, the notification unit 7 causes the indicator 4 to display the "running" indication. The content of the "running" indication is the same as that of the first embodiment.

In Step 14, the notification unit 7 causes the indicator 4 to display the "not running" indication. The content of the "not running" indication is the same as that of the first embodiment.

3. Effect Achieved by Notification Device 101

The notification device 101 produces the following effect, in addition to the effect (1C) of the first embodiment.

(2A) The notification unit 101 detects the motion of the hook 19 using the sensor 41. When the hook 19 is in motion, the "running" indication is displayed. Therefore, the "running" indication by the notification device 101 continues if the hook 19 is in motion even after there is an operation input to stop moving in the X-direction, Y-direction, or Z-direction. As a result, the operator of the moving device 3 can easily recognize that the hook 19 is in motion. Thereby, safety of the operator is enhanced.

<Third Embodiment>

1. Configuration of Notification Device 201, Moving Device 3, and Indicator 4

Figure 8:
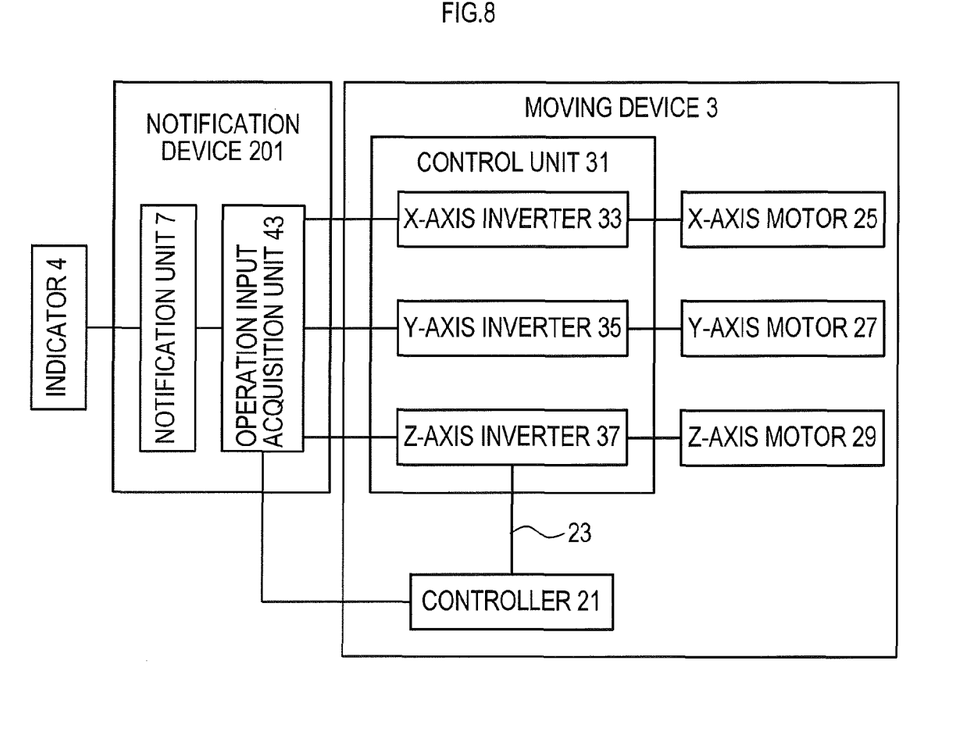
FIG. 8 is a block diagram showing an electrical configuration of a notification device, a moving device, and an indicator according to a third embodiment of the present invention.

A configuration of a notification device 201, the moving device 3, and the indicator 4 will be described with reference to FIG. 8. The moving device 3 and the indicator 4 are the same as those of the first embodiment.

Although the notification device 201 is basically the same as that of the notification device 1 of the first embodiment, there are some differences. The differences will be focused in the following description. The notification device 201 functionally comprises an operation input acquisition unit 43, and the notification unit 7. The operation input acquisition unit 43 acquires an operation input from the controller 21. Further, the operation input acquisition unit 43 acquires the operation information of the X-axis motor 25 from the X-axis inverter 33, operation information of the Y-axis motor 27 from the Y-axis inverter 35, and operation information of the Z-axis motor 29 from the Z axis inverter 37.

2. Process Executed by Notification Device 201

Figure 9:
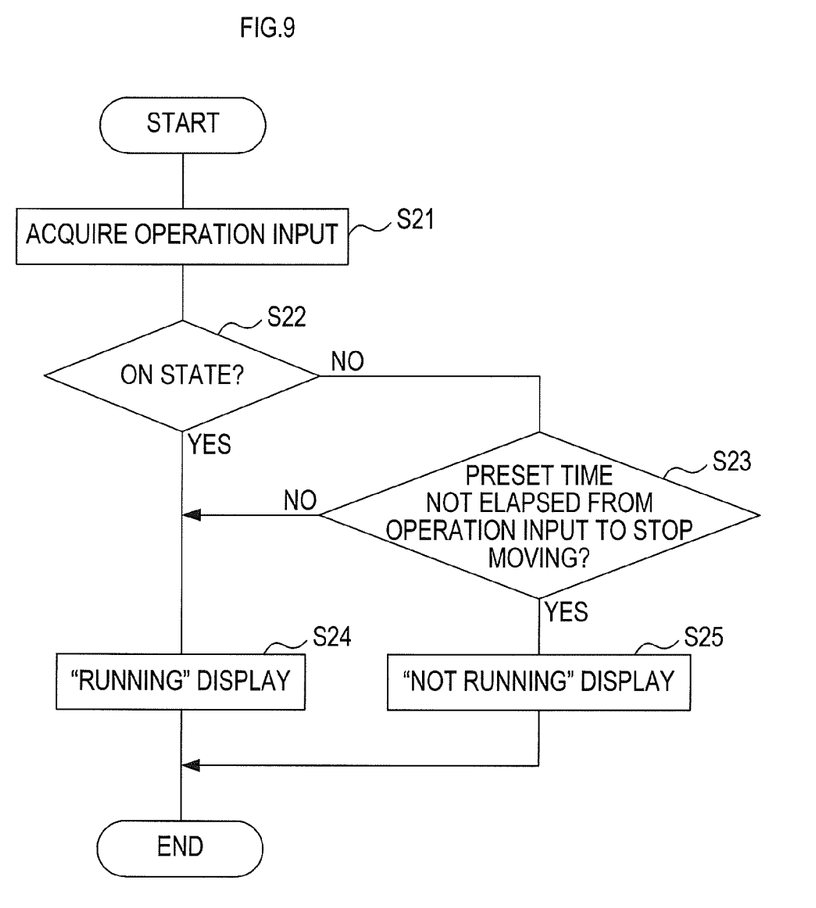
FIG. 9 is a flowchart illustrating a process executed by the notification device shown in FIG. 8.

A process repeated by the notification device 201 at fixed time intervals will be described with reference to FIG. 9. In Step 21 of FIG. 9, the operation input acquisition unit 43 acquires an operation input from the controller 21.

In Step 22, the notification unit 7 determines whether there is an ON state in at least one of the X-direction, Y-direction, and Z-direction. Here, the ON state in the X-direction means that there is already an operation input to start moving in the X-direction, and there is not yet an operation input to stop moving in the X-direction (a state in which the hook 19 is moving in the X direction). The ON state in the Y direction means that there is already an operation input to start moving in the Y-direction, and there is not yet an operation input to stop moving in the Y-direction (a state in which the hook 19 is moving in the Y-direction). The ON state in the Z-direction means that there is already an operation input to start moving in the Z-direction, and there is not yet an operation input to stop moving in the Z direction (a state in which the hook 19 is moving in the Z direction).

The process proceeds to Step 24 when there is an ON state in any of the directions. Otherwise, the process proceeds to Step 23.

In Step 23, the notification unit 7 determines whether the following condition is satisfied in at least one of the X-direction, Y-direction, and Z-direction.

Condition: "a preset time has not yet elapsed from when there is an operation input to stop moving."

It is preferable to set the above preset time to be equal to or longer than time T required until the motor stops from when there is an operation input to stop moving. If the time T changes by the circumstances, the above preset time can be also changed according to the time T.

If the above condition is satisfied in at least one of the X direction, Y direction, and Z direction, the process proceeds to Step 24. Otherwise the process proceeds to Step 25.

In Step 24, the notification unit 7 causes the indicator 4 to display the "running" indication. The content of the "running" indication is the same as that of the first embodiment.

In Step 25, the notification unit 7 causes the indicator 4 to display the "not running" indication. The content of the "not running" indication is the same as that of the first embodiment.

3. Effect Achieved by Notification Device 201

The notification device 201 produces the following effect, in addition to the effect (1C) of the first embodiment.

(3A) After the operation input to stop moving, the motor may operate for a while and the movement of the hook 19 may continue. Also, even if the hoist 15 is not moving after the operation input to stop moving, there are cases in which the hook 19 and an article hung thereon are swinging.

The "running" indication by the notification device 201 continues, if the condition that "the preset time has not yet elapsed from when there is an operation input to stop moving" is satisfied in at least one of the X-direction, Y-direction, and Z-direction. That is, the notification unit 201 continues the "running" indication from when the operation input to stop moving is acquired by the operation input acquisition unit 43 until when the preset time elapses.

Thereby, even after when there is an operation input to stop moving, the "running" indication can be displayed during a period in which there is a possibility that the hook 19 and the article hung thereon are swinging. As a result, safety of the operator is enhanced.

<Other Embodiments>

The embodiments of the present invention have been described above. However, the present invention is not limited to the above embodiments, and may take various forms.

(1) In the first embodiment, the operation information acquisition unit 5 may acquire operation information of part of the three motors (e.g., X-axis motor 25, Y axis motor 27, or both). Then, if all of the part of the motors is in operation, an affirmative determination may be made at Step 2. Otherwise, a negative determination may be made.

(2) In the second embodiment, the sensor 41 and the operation detection unit 39 may detect the motion of the article attached to hook 19 instead of the hook 19. Then, an affirmative determination may be made at Step 12 if the article is moving. Otherwise, a negative determination may be made.

(3) In Step 22 of the third embodiment, whether there is an ON state may be determined with respect to part of the movements in the X direction, Y direction, and Z direction. If the part is ON, an affirmative determination may be made. Otherwise, a negative determination may be made.

(4) In the first to third embodiments, the control unit 31 may control the motor by a component other than the inverter (for example, a magnet contactor, etc.)

(5) In the first to third embodiments, the "running" indication and the "not running" indication can be appropriately set. For example, the "running" indication may be a character indication such as "RUNNING", "MOVING", "DANGER" or "CAUTION", may be flashing of light, or may be an indication of a particular color. Also, the "not running" indication can be appropriately set as long as it is distinguished from the "running" indication. The difference between the "not running" indication and the "running" indication can be, for example, presence or absence of such as a character string or arrow, difference in color, difference in brightness, difference between video and still image, and the like.

The indicator 4 may make a notification by sound or vibration, in place of the image indication, or in addition to the image indication.

(6) In the first to third embodiments, a form of the moving device 3 may be selected as appropriate. The moving device 3, for example, can be a hoist type overhead traveling crane, a trolley-type overhead traveling crane, a turning mandrill type overhead traveling crane, an overhead traveling crane with shuttle girder, a pivoting overhead traveling crane, an overhead traveling crane for steel or the like.

(7) In the first to third embodiments, a moving object other than the hook 19 may be used. For example, it is possible to use a moving body that adsorbs an article by magnetic force, a moving body that adsorbs an article by a vacuum chuck, a moving body that holds and fixes an article like a vise or the like.

(8) A whole or part of the components of each embodiment may be selected and combined as appropriate.

(9) Besides the above-mentioned notification devices 1, 101, 201, and movement system, it is also possible to implement the present invention in various forms, for example, as a system having the movement system as a component (for example, a crane operation system with the movement system and the indicator 4), a program for causing a computer to function as the notification device 1, 101, 201, a program for causing a computer to function as the control unit 31 of the moving device 3, a medium recording these programs, a method of using the notification device 1, 101, 201, a method of using the moving device 3, a method of using the movement system, a method of using a crane operation system, a method of moving an article, etc.

The invention claimed is:

1. A notification device used in a moving device comprising a controller that controls a moving device motor in response to an operation input from a human operator and being configured to be capable of moving a moving body in three dimensions by a driving force of the moving device motor, the notification device comprising:
    a computer configured to acquire operation information of the moving device motor from the controller, and to make, when the moving device motor is in operation, a visual notification through an indicator, the visual notification being visible to the human operator and differing from a visual notification at a time when the moving device motor is stopped.

2. A notification device according to claim 1, wherein the controller controls the moving device motor using an inverter, and the computer acquires the operation information from the inverter.

3. A notification device according to claim 1, wherein the notification device makes a visual notification by displaying an image through the indicator.

4. A notification device according to claim 2, wherein the notification device makes a visual notification by displaying an image through the indicator.

5. A notification device used in a moving device comprising a controller that controls a moving device motor in response to an operation input from a human operator and being configured to be capable of moving a moving body in three dimensions by a driving force of the moving device motor, the notification device comprising:
    a computer configured to detect a motion of the moving body or an article attached to the moving body, and to make, when the moving body or the article is in motion, a visual notification through an indicator, the visual notification being visible to the human operator and different from a visual notification at a time when the moving body or the article is stopped.

6. A notification device according to claim 5, wherein the notification device makes a visual notification by displaying an image through the indicator.

7. A notification device used in a moving device comprising a controller that controls a moving device motor in response to at least one operation input from a human operator and being configured to be capable of moving a moving body in three dimensions by a driving force of the moving device motor, the notification device comprising:

a computer configured to acquire the at least one operation input, to make a prescribed visual notification, visible to the human operator, through an indicator when the computer acquires a first operation input of the at least one operation input, instructing the computer to start operation of the moving device motor, and to continue the prescribed visual notification, visible to the human operator, from when the computer acquires a second operation input of the at least one operation input, instructing the computer to stop operation of the moving device motor until a preset time elapses.

8. A notification device according to claim 7, wherein the notification device makes a prescribed visual notification by displaying an image through the indicator.

9. A movement system comprising a notification device according to claim 1, and the moving device.

10. A movement system according to claim 9, wherein the moving device comprises an overhead traveling crane.

11. A movement system comprising a notification device according to claim 2, and the moving device.

12. A movement system comprising a notification device according to claim 5, and the moving device.

13. A movement system according to claim 12, wherein the moving device comprises an overhead traveling crane.

14. A movement system comprising a notification device according to claim 7, and the moving device.

15. A movement system according to claim 14, wherein the moving device comprises an overhead traveling crane.

16. A movement system comprising a notification device according to claim 3, and the moving device.

\* \* \* \* \*